(12) United States Patent
Yao et al.

(10) Patent No.: US 11,899,699 B2
(45) Date of Patent: Feb. 13, 2024

(54) KEYWORD GENERATING METHOD, APPARATUS, DEVICE AND STORAGE MEDIUM

(71) Applicant: BEIJING BAIDU NETCOM SCIENCE TECHNOLOGY CO., LTD., Beijing (CN)

(72) Inventors: Kaichun Yao, Beijing (CN); Chuan Qin, Beijing (CN); Hengshu Zhu, Beijing (CN); Chao Ma, Beijing (CN); Jingshuai Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 385 days.

(21) Appl. No.: 17/347,448

(22) Filed: Jun. 14, 2021

(65) Prior Publication Data
US 2021/0303608 A1    Sep. 30, 2021

(30) Foreign Application Priority Data
Dec. 18, 2020   (CN) .......................... 202011505008.5

(51) Int. Cl.
*G06F 40/289*    (2020.01)
*G06F 40/40*    (2020.01)
(Continued)

(52) U.S. Cl.
CPC ........ *G06F 16/3329* (2019.01); *G06F 16/335* (2019.01); *G06F 40/20* (2020.01)

(58) Field of Classification Search
CPC ........ G06F 40/30; G06F 40/279; G06F 40/20; G06F 40/205; G06F 16/3344;
(Continued)

(56) References Cited

U.S. PATENT DOCUMENTS 10,140,340 B2 * 11/2018 Monsch ............ G06F 16/24578
2013/0246322 A1 * 9/2013 De Sousa Webber .......................
                                                        G06N 3/088
                                                        706/18
(Continued)

FOREIGN PATENT DOCUMENTS

| CN | 108304364 A | 7/2018 |
| CN | 109933804 A | 6/2019 |

(Continued)

OTHER PUBLICATIONS

Wang et al. Keyword extraction from online product reviews based on bi-directional LSTM recurrent neural network, In2017 IEEE International Conference on Industrial Engineering and Engineering Management (IEEM) Dec. 1, 20170 (pp. 2241-2245). IEEE. ( Year: 2017).*

(Continued)

*Primary Examiner* — Olujimi A Adesanya
(74) *Attorney, Agent, or Firm* — J.C. PATENTS (57) ABSTRACT

This application discloses a keyword generating method, an apparatus, a device and a storage medium, which relate to the field of natural language processing in the field of artificial intelligence. A specific implementation scheme includes: inputting a target text into a text processing model, obtaining a word sequence corresponding to the target text, and generating a semantic representation sequence corresponding to the word sequence; making prediction about each semantic representation vector in the semantic representation sequence respectively to obtain a prediction result; and if the prediction result indicates that a word corresponding to the semantic representation vector is capable of triggering a generation of a keyword, outputting the keyword based on the semantic representation vector and the (Continued)

prediction result. This method improves the accuracy of generating keywords.

15 Claims, 3 Drawing Sheets

(51) Int. Cl.
  *G06F 16/332* (2019.01)
  *G06F 16/335* (2019.01)
  *G06F 40/20* (2020.01)
(58) Field of Classification Search
  CPC .............. G06F 18/213; G06F 40/284; G10L 2015/088; G10L 15/1822; G10L 17/18
  See application file for complete search history.

(56) References Cited

U.S. PATENT DOCUMENTS

| | | | |
|---|---|---|---|
| 2013/0246356 A1* | 9/2013 | Taylor ................ | G06F 16/2379 707/629 |
| 2016/0180838 A1 | 6/2016 | Parada San Martin | |
| 2018/0300295 A1* | 10/2018 | Maksak .................. | G06N 3/08 |
| 2020/0250376 A1* | 8/2020 | Guo ........................ | G06N 3/04 |
| 2021/0209356 A1* | 7/2021 | Wang .................... | G06F 18/213 |
| 2021/0303608 A1* | 9/2021 | Yao ........................ | G06F 40/20 |

FOREIGN PATENT DOCUMENTS

| CN | 110119765 A | 8/2019 |
|---|---|---|
| CN | 110263323 A | 9/2019 |
| CN | 110704588 A | 1/2020 |

OTHER PUBLICATIONS

Villmow et al, "Automatic keyphrase extraction using recurrent neural networks", 2018, InMachine Learning and Data Mining in Pattern Recognition: 14th International Conference, MLDM 2018, New York, NY, USA, Jul. 15-19, 2018, Proceedings, Part II 14 2018 (pp. 210-217). (Year: 2018).*

Calanca F et al, "Responsible team players wanted: an analysis of soft skill requirements in job advertisements" 2019, EPJ Data Science. Dec. 2019;8(1):1-20. (Year: 2019).*

Notice of Allowance of the priority application CN202011505008.5.

"Chinese Short Text Keyphrase Extraction Model Based on Attention", Computer Science (计算机科学), vol. 4 7, No. 1, Jan. 2020.

"Dual Encoding for Abstractive Text Summarization", IEEE, Mar. 31, 2020.

* cited by examiner

KEYWORD GENERATING METHOD, APPARATUS, DEVICE AND STORAGE MEDIUM

CROSS-REFERENCE TO RELATED APPLICATIONS

This application claims priority to Chinese Patent Application No. 202011505008.5, filed on Dec. 18, 2020, entitled "KEYWORD GENERATING METHOD, APPARATUS, DEVICE AND STORAGE MEDIUM", which is incorporated herein by reference in its entirety.

TECHNICAL FIELD

Embodiments of this application relate to artificial intelligence technologies and, in particular, to a keyword generating method, an apparatus, a device and a storage medium, which can be used in the field of natural language processing.

BACKGROUND

In natural language text processing, it is often necessary to extract keywords from a text, e.g., to extract words from an article as tags for the article when publishing on an online platform, or to mine skill phrases from a large amount of recruitment data to facilitate job matching and talent identification.

When mining keywords from a text, one method is to extract words directly from the text to form keywords, and another method is to use neural network models to generate keywords directly based on the text content. However, these methods have the problem of low accuracy.

SUMMARY

This application provides a keyword generating method, an apparatus, a device and a storage medium with improved accuracy.

According to an aspect of this application, a keyword generating method is provided, including:
inputting a target text into a text processing model, obtaining a word sequence corresponding to the target text, and generating a semantic representation sequence corresponding to the word sequence;
making prediction about each semantic representation vector in the semantic representation sequence respectively to obtain a prediction result; and
if the prediction result indicates that a word corresponding to the semantic representation vector is capable of triggering a generation of a keyword, outputting the keyword based on the semantic representation vector and the prediction result.

According to another aspect of this application, a keyword generating apparatus is provided, including:
an input module, configured to: input a target text into a text processing model, obtain a word sequence corresponding to the target text, and generate a semantic representation sequence corresponding to the word sequence;
a predicting module, configured to: make prediction about each semantic representation vector in the semantic representation sequence respectively to obtain a prediction result; and
an output module, configured to: if the prediction result indicates that a word corresponding to the semantic representation vector is capable of triggering a generation of a keyword, output the keyword based on the semantic representation vector and the prediction result.

According to still another aspect of this application, an electronic device is provided, including:
at least one processor; and
a memory in communication with the at least one processor, where:
the memory stores thereon instructions executable by the at least one processor, and the instructions are executed by the at least one processor to enable the at least one processor to execute the above keyword generating method.

According to still another aspect of this application, a non-transitory computer-readable storage medium is provided, storing thereon computer instructions that are used to cause the computer to execute the above keyword generating method.

According to yet another aspect of this application, a computer program product is provided, including a computer program that, when executed by a processor, implements the above keyword generating method.

The technical solution according to this application solves the problem of low accuracy in generating keywords based on the target text.

It should be understood that what is described in this section is not intended to identify critical or important features of embodiments of this application, nor is it intended to limit the scope of this application. Other features of this application will be readily understood by the following specification.

BRIEF DESCRIPTION OF THE DRAWINGS

The drawings are used to facilitate understanding of this solution, and do not constitute any limitation on this application. In the drawings.

DESCRIPTION OF EMBODIMENTS

Now, exemplary embodiments of this application will be described with reference to the accompanying drawings, which include various details of the embodiments of this application to facilitate understanding, and shall be considered as merely exemplary. Therefore, those of ordinary skill in the art should appreciate that various changes and modifications can be made to the embodiments described herein without departing from the scope and spirit of this application. Also, for clarity and conciseness, descriptions of well-known functions and structures are omitted in the following description.

Natural language processing is an important domain in the field of artificial intelligence. One of the problems often faced in natural language processing is how to extract a keyword from a natural language text. For example, a word may be extracted from an article and be used as a tag for the article when publishing on an online platform, or a skill phrase may be mined from recruitment data to facilitate job matching and talent identification. For example, there is a huge amount of resume information and job description information in job websites, and these data usually include a large number of skill phrases, such as Internet operation, graphic design, database, programming, etc. The key to realize intelligent talent management lies in how to accurately mine skill phrases from these resume information and job description information.

In an example, when mining keywords from a text, words are directly extracted from the text to form keywords. However, there can be missed or wrong keywords when this direct extraction method is used, leading to low accuracy. In another example, a neural network model is used to generate keywords directly based on the text content, but the models used in the related art also have the problem of low accuracy.

This application provides a keyword generating method for application in the field of natural language processing in the field of artificial intelligence. The method is based on a text processing model which obtains a semantic representation vector by encoding a word in the text, then predicts, for each semantic representation vector, whether a corresponding word can trigger generation of a keyword, and then generates a keyword based on the prediction result and the semantic representation vector, thereby improving the accuracy and recall rate of the keyword generated as such.

In the following, the keyword generating method provided in this application will be described in detail by specific embodiments. It can be appreciated that the following specific embodiments may be recombined with each other, and the same or similar concepts or processes may not be repeated in some embodiments.

Figure 1:
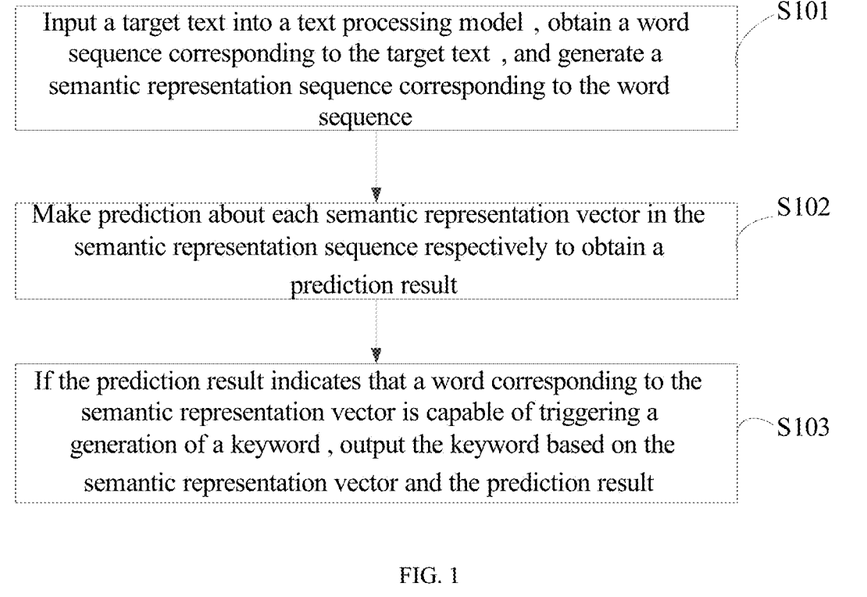
FIG. 1 is a flowchart of a keyword generating method provided in accordance with an embodiment of this application.

FIG. 1 is a flowchart of a keyword generating method provided in accordance with an embodiment of this application. As shown in FIG. 1, the method includes:

S101: input a target text into a text processing model, obtain a word sequence corresponding to the target text, and generate a semantic representation sequence corresponding to the word sequence.

The keyword generating method of this embodiment is based on a text processing model. After the target text is fed into the text processing model, the subsequent processing steps are completed by the text processing model. The word sequence corresponding to the target text can be obtained by applying word separation processing to the target text, and this embodiment does not make any specific limitation on the word separation algorithm. After the target text is divided into words, individual words in the word sequence are encoded to obtain a semantic representation vector corresponding thereto, i.e., the semantic representation sequence corresponding to the target text.

S102: make prediction about each semantic representation vector in the semantic representation sequence respectively to obtain a prediction result.

The text processing model sequentially processes each semantic representation vector in the semantic representation sequence, starting from making prediction about the first semantic representation vector, and the prediction result is used to indicate whether the word corresponding to this semantic representation vector can lead to generation of a keyword. In the case of generating a skill phrase based on a job posting, the prediction result is used to indicate whether a word in the job posting can trigger the generation of a skill phrase. After making prediction about the first semantic representation vector in the semantic representation sequence, prediction is made about the next semantic representation vector, so as to ensure that the prediction result of the word corresponding to a later semantic representation vector is correlated with the word before it.

S103: if the prediction result indicates that a word corresponding to the semantic representation vector is capable of triggering a generation of a keyword, output the keyword based on the semantic representation vector and the prediction result.

When the text processing model makes prediction about the semantic representation vector and determines that a word corresponding to the semantic representation vector can trigger the generation of a keyword, it is necessary to further output the keyword based on the semantic representation vector and the prediction result. If the prediction result indicates that the word corresponding to the semantic representation vector cannot trigger the generation of a keyword, it is not necessary to further determine the keyword corresponding thereto, but it is necessary to continue the prediction process for the next semantic representation vector, continuing to output the keyword based on the prediction result.

The keyword generating method provided in the embodiment of this application is based on a text processing model, which first predicts whether a word corresponding to the target text can trigger the generation of a keyword, and then outputs the keyword based on the semantic representation vector of the word and a prediction result, thus improving the accuracy of the generated keywords.

Figure 2:
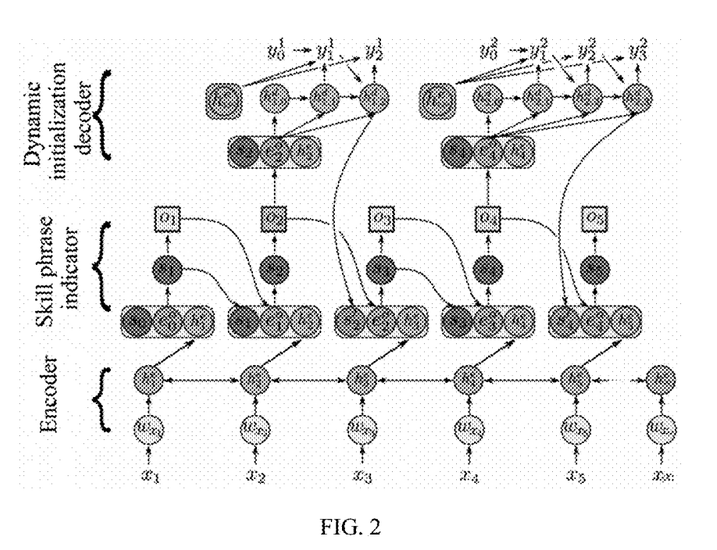
FIG. 2 is a schematic diagram of a text processing model provided in accordance with an embodiment of this application.

FIG. 2 is a schematic diagram of a text processing model provided in accordance with an embodiment of this application. As shown in FIG. 2, the text processing model includes an encoder, a keyword indicator (exemplified by a skill phrase indicator), and a dynamic initialization decoder. Now, the method of the above embodiment will be described in conjunction with the structure of the model.

First, the generating a semantic representation sequence corresponding to the word sequence in S101 can be accomplished by the encoder in the text processing model.

After applying a word separation process to the target text to obtain a word sequence corresponding to the target text, the word vector sequence corresponding to a word sequence is determined, and then a bi-directional Long Short-Term Memory (LSTM) encoder is used to encode the word vector sequence to obtain a corresponding semantic representation sequence. Here, the bidirectional LSTM enables the semantic representation sequence of each word to reflect the contextual meaning of the word, thus making subsequent prediction result and the generated keywords more accurate.

As shown in FIG. 1, a target text corresponds to a word vector sequence $(x_1, x_2, x_3, x_4, x_5, \ldots, x_{|X|})$, where $x_1$ to $x_{|X|}$ individually represent a word, and $|X|$ is the quantity of the words. $(w_{x1}, w_{x2}, w_{x3}, w_{x4}, w_{x5}, \ldots, w_{x|X|})$ denotes the word vector sequence corresponding to the word sequence, where $w_{x1}$ to $w_{x|X|}$ are the word vectors corresponding to $x_1$ to $x_{|X|}$, respectively. $(h_1^e, h_2^e, h_3^e, h_4^e, h_5^e, \ldots, h_{|X|}^e)$ denotes the semantic representation sequence corresponding to the word vector sequence, where $h_1^e$ to $h_{|X|}^e$ are the semantic representation vectors corresponding to $w_{x1}$ to $w_{x|X|}$, respectively.

After obtaining the above semantic representation sequence, the making prediction about each semantic representation vector in the semantic representation sequence respectively to obtain a prediction result in S102 in the above embodiment is accomplished by the keyword indicator in the text processing model shown in FIG. 2.

The keyword indicator sequentially scans each semantic representation vector in the semantic representation sequence. A state of the keyword indicator at a current moment is determined based on a state of the keyword indicator at a previous moment, an embedded vector of a prediction result of the keyword indicator at the previous moment, and the semantic representation vector. A probability of the semantic representation vector triggering a skill phrase is determined based on the state of the keyword indicator at the current moment, and a prediction result of the keyword indicator is determined based on the probability, where the prediction result includes that: the semantic representation vector is incapable of triggering generation of a skill phrase, the semantic representation vector is capable of triggering generation of a skill phrase composed of consecutive words, or the semantic representation vector is capable of triggering generation of a skill phrase composed of non-consecutive words.

Specifically, the keyword indicator predicts whether a current word can trigger a skill phrase by sequentially scanning the semantic representation vector of the input word sequence. The prediction result includes three cases, or three options, i.e., $o_i \in \{0, 1, 2\}$, where $o_i$ of 0 indicates that the current word cannot trigger the generation of a keyword; $o_i$ of 1 indicates that the current word can trigger the generation of a keyword composed of consecutive words; and $o_i$ of 2 indicates that the current word will trigger the generation of a keyword composed of non-consecutive words.

Now, keywords composed of consecutive words and keywords composed of non-consecutive words are explained. For example, in case of generating a skill phrase based on a job posting, if the text in the job posting is "system architecture and application", there can be two corresponding skill phrases, one is "system architecture" and the other is "system application", where "system architecture" is a skill phrase composed of consecutive words, and "system application" is a skill phrase composed of non-consecutive words.

By distinguishing between keywords composed of consecutive words and non-consecutive words in the prediction result, the keywords generated in the end can accurately include keywords composed of consecutive words and non-consecutive words, avoiding the problem of not being able to obtain keywords composed of non-consecutive words if only consecutive words are extracted from the text to generate the keywords.

On the basis of the three prediction result defined above, at a current moment i, i.e., for a word $x_i$ corresponding to the semantic representation vector $h_i^e$ at the current prediction, the keyword indicator learns a state $s_i$ at the current moment based on a state at a previous moment $s_{i-1}$, an embedded vector $e_{i-1}^o$ of a prediction result oat the previous moment, and the semantic representation vector $h_i^e$ of the word $x_i$ at the current moment using the equation below:

$$s_i = f_s(W_s[h_i^e; e_{i-1}^o; s_{i-1}] + b_s)$$

where, $f_s$ denotes a nonlinear function based on Multilayer Perceptron (MLP), the symbols [a;b] denotes concatenating vector a with vector b, and $W_s$ and $b_s$ denote learning parameters. For the first word, the previous state is an initial 0 state. It should be noted that, when the prediction result of the previous moment is triggering the generation of a keyword, the keyword indicator learns the state $s_i$ at the current moment based on a hidden state of a previous decoding step of the decoder at the previous moment, an embedded vector $e_{i-1}^o$ of the prediction result $o_i$ at the previous moment and the semantic representation vector $h_i^e$ of the word $x_i$ at the current moment, where the hidden state will be described in later steps.

The keyword indicator predicts the probability $P_o(o_i|s_i)$ of $o_i$ based on the state $s_i$ at the current moment using the equation below:

$$P_o(o_i|s_i) = \text{softmax}(W_o s_i + b_o)$$

where $W_o$ and $b_o$ denote learning parameters.

The keyword indicator uses the above probability to determine the prediction result $o_i$. For example, $o_i$ can be generated according to the probability, or $o_i$ having the largest probability can be selected to be the prediction result. The prediction result $o_i$ will be used as explicit hint information to assist the subsequent decoders to generate keywords.

After the keyword indicator has obtained the above prediction result, the outputting the keyword based on the semantic representation vector and the prediction result in S103 in the above embodiment can be accomplished by the dynamic initialization decoder in the text processing model shown in FIG. 2.

The decoder determines an initial hidden state of the decoder based on the semantic representation vector, an embedded vector of a prediction result of the keyword indicator, and a state of the keyword indicator; and determines, for each decoding step, a hidden state of each decoding step based on the initial hidden state, and generates the keyword by decoding the hidden state of each decoding step.

For the first decoding step, a hidden state of the first decoding step is determined based on the initial hidden state, an embedded vector of a prediction result of the keyword indicator, and an embedded vector of default initial character. For each decoding step after the first decoding step, a hidden state of each decoding step is determined based on a hidden state of a previous decoding step of the decoder, an embedded vector of a prediction result of the keyword indicator, and an embedded vector of a decoding result of the previous decoding step.

FIG. 2 is referred to as an illustration. Whenever the keyword indicator triggers a keyword (i.e., a non-zero $o_i$ is predicted), the decoder begins decoding to generate a corresponding keyword based on an initial hidden state $h_o^d$. This initial hidden state hg is based on the hidden state $h_i^e$ of the current word $x_i$, an embedding semantic vector $e_i^o$ of the $o_i$ predicted by the keyword indicator, and a state $s_i$ of the keyword indicator at the current moment, which is calculated as below:

$$h_0^d = f_h(W_h[h_i^e; e_i^o; s_i] + b_h)$$

where $f_h$ is a nonlinear function based on MLP, and $W_h$ and $b_h$ denote learning parameters.

Based on the above vector for calculating the initial hidden state $h_0^d$, it can be seen that the semantics of the current word $x_i$ and the contextual semantics of the current word $x_i$ are reflected in the initial hidden state $h_0^d$. After obtaining the initial hidden state $h_0^d$, the decoder generates a corresponding keyword by a one-directional LSTM. At the j-th decoding step, the hidden state $h_j^d$ of the decoder is represented as:

$$h_j^d = LSTM\left(\left[w_{y_{j-1}^i}; e_i^o\right], h_{j-1}^d\right).$$

where $y_{j-1}^i$ denotes the (j−1)-th word of the i-th keyword, and $w_{y_{j-1}}^i$ is the embedded vector of the (j−1)-th word of the i-th keyword. Corresponding to the first decoding step, i.e., the first word of the i-th keyword, $w_{y_0}^i$ is the embedded vector of a default initial character.

After obtaining the above hidden state, the decoder: determines a correlation of the semantic representation vector to the hidden state of each decoding step, and determines an attention distribution for each decoding step based on the correlation; determines a semantic vector of the hidden state of each decoding step based on the attention distribution of each decoding step and the semantic representation sequence; determines an initial word probability for each decoding step based on the hidden state of each decoding step and the semantic vector of the hidden state of each decoding step; determines a word probability for each decoding step based on the initial word probability and the attention distribution; and determines a decoding result for each decoding step based on the word probability.

Specifically, the decoder uses an attention mechanism to better obtain the contextual semantic vector $C_j$ of the word corresponding to the current hidden state $h_j^d$ based on the hidden state at the current moment $h_j^d$, specifically as below:

$$f_\alpha(h_i^e, h_j^d) = v_\alpha^T \tanh(W_\alpha[h_i^e; h_j^d] + b_\alpha),$$

$$\alpha_j^i = \frac{\exp(f_\alpha(h_i^e, h_j^d))}{\sum_{k=1}^{|X|} \exp(f_\alpha(h_k^e, h_j^d))},$$

$$C_j = \sum_{i=1}^{|X|} \alpha_j^i h_i^e$$

where $f_\alpha(h_i^e, h_j^d)$ denotes the correlation of the semantic representation vector $h_i^e$ to the hidden state $h_j^d$ of each decoding step, $v_\alpha$, $W_\alpha$ and $b_\alpha$ denote learning parameters, and $\alpha_j^i$ is the attention distribution.

The initial probability of the j-th word $y_j^i$ for the i-th keyword is:

$$p_i^y(y_j^i) = \text{softmax}(W_v[C_j; h_j^d] + b_v)$$

where $W_v$ and $b_v$ denote learning parameters.

Based on the above initial probability, an Out of Vocabulary (OOV) problem in the keyword generating process is mitigated by introducing a replication mechanism as follows:

$$g_j = \text{sigmoid}\left(W_g\left[h_j^d; C_j; w_{y_{j-1}^i}\right] + b_g\right)$$

where $g_j$ is the probability weight, and $W_g$ and $b_g$ denote learning parameters.

Eventually, the decoding result of each decoding step, i.e., the word probability of each word in the keyword, is:

$$P_v(y_j^i) = g_j \cdot p_j^y(y_j^i) + (1 - g_j) \cdot \sum_{k: r_k = y_j^i}^{|X|} \alpha_j^k$$

Each word in the keyword is outputted according to the above word probability. For example, the word having the highest word probability is outputted.

The keyword generating method provided in this embodiment predicts whether the current word can generate a keyword composed of consecutive words or non-consecutive words by a keyword indicator, and then generates keywords based on this prediction result and a semantic representation vector. In generating the keywords, each decoding step of the decoder is based on the initial hidden state and the hidden state at the previous moment. By introducing an attention mechanism and a replication mechanism, the generated keywords include keywords composed of consecutive words as well as keywords composed of discontinuous words, which makes the accuracy and recall rate higher. Moreover, the prediction result by the keyword indicator can clearly indicate the origin of each generated keyword in the target text, which makes the outcome more explainable.

The above embodiment illustrates how keywords can be generated if the target text is processed by the text processing model shown in FIG. 2. The following is a more detailed description of how to train and optimize this text processing model.

For the keyword indicator, a good prediction result will provide effective hint information that benefits the decoder in terms of keyword generating. On the other hand, the quality of the keyword generated by the decoder also provides feedback about whether the prediction result of the keyword indicator is good or poor. Therefore, the quality of keyword generating is improved in this application embodiment by feedback exchanges between the skill phrase indicator and the decoder. Hierarchical reinforcement learning algorithm is used in this application embodiment to optimize the prediction result as well as the exchange process of keyword generating.

Figure 3:
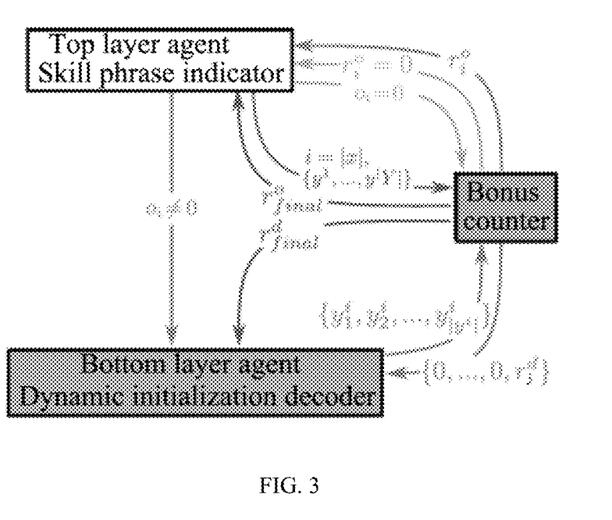
FIG. 3 is a schematic diagram of interactions between a keyword indicator and a decoder provided according to an embodiment of this application.

As shown in FIG. 3, the keyword indicator can be regarded as a top layer agent that determines whether a keyword will be triggered by predicting the option. The decoder can be regarded as a bottom layer agent, and the keyword generating can be regarded as a sequential decision process.

Based on the prediction result of the keyword indicator and the keyword generated by the decoder, a bonus value for the keyword indicator and a bonus value for the decoder are determined, where the bonus value of the keyword indicator is used to indicate an accuracy of the prediction result of the keyword indicator, and the bonus value of the decoder is used to indicate an accuracy of the keyword generated by the decoder. Parameters in the encoder, the keyword indicator and the decoder is adjusted to maximize an expected value of the bonus value of the keyword indicator and the expected value of the bonus value of the decoder. The bonus value of the keyword indicator and the bonus value of the decoder both include a bonus value corresponding to triggering per keyword and a bonus value corresponding to all keywords, thus making the feedback between the keyword indicator and the decoder more accurate and making the optimization better.

For the keyword indicator, at an i-th moment, the keyword indicator samples an $o_i$ based on a probability function $P_o$ $(o_i|s_i)$, and the quality of the current prediction about the $o_i$ is evaluated based on a feedback from the decoder. Specifically, if the keyword indicator's prediction result is the triggering of a keyword, the keyword indicator will receive a delayed intermediate bonus $r_i^o$ from the decoder. $r_i^o$ will be set to +1 if the decoder generates the correct keyword, or set to −1 if otherwise. In addition, a final bonus $r_{final}^o$ is calculated to evaluate the qualities of all predictions about the options:

$$r_{final}^o = \begin{cases} R & \text{if } N < |Y|, \\ \frac{(1+\beta^2)P*R}{\beta^2 P + R} & \text{otherwise}, \end{cases}$$

where P and R represent the recall rate and accuracy of the model, respectively, and β is the learning parameter. N denotes the quantity of keywords that have been generated; |Y| denotes the true quantity of the keywords.

For the decoder, at an i-th moment, the keyword indicator samples a non-zero $o_i$, the decoder samples every word $y_j^i$ in the keyword from the probability function $P_y(y_j^i)$. Each time the sampling is done on entire keyword, the decoder will receive a timely bonus $r_j^d$ to evaluate the quality of the current decision process. Specifically, $r_j^d$ will be set to +1 if a correct skill phrase is generated, or set to −1 if otherwise, while $r_j^d$ is set to 0 at other sampling moments. In addition, a final bonus $r_{final}^d$ is computed to evaluate the entire sequential decision process: $r_{final}^d$ will be set to +1 if all keywords are correctly predicted, or set to −1 if otherwise.

Having determined the above incentive measures, the training objectives of the model are now described. $\theta_e$, $\theta_k$ and $\theta_d$ are used to denote the learning parameters in the encoder, the keyword indicator, and the dynamic initialization decoder, respectively.

For the keyword indicator, the optimization objective aims to maximize the expectation of bonus accumulated in the future to optimize the top-level policy $P_0$:

$$J(\theta_e, \theta_k) = E_{o_i \sim P_o(o_i|s_i;\theta_e,\theta_k)}[R(o_i)]$$

where the bonus accumulated in the future $$R(o_i) = r_{final}^o + \sum_{k=i}^{|X|} [\gamma^{k-i} r_k^o],$$

where γ is a discount factor.

For the decoder, the optimization objective aims to maximize the expectation of accumulated bonus to optimize the bottom-level policy $P_y$:

$$\mathcal{J}(\theta_e, \theta_d) E_{y_j^i \sim P_y(y_j^i|h_j^d;\theta^e,\theta_d)}[R(y_j^i)],$$

where the accumulated bonus $R(y_j^i) = r_{final}^d + \sum_{k=i}^{|y^i|} [\gamma^{k-j} r_k^d]$, and $|y^i|$ denotes the quantity of words in the i-th keyword.

While optimizing the learning parameters according to the above optimization objectives, an adjustment gradient for the parameters in the encoder, the keyword indicator and the decoder is determined based on the bonus value of the keyword indicator, the bonus value of the decoder, the probability of the prediction result of the keyword indicator and a probability of the decoding result of the decoder, making the adjustment gradient more accurate. The specifics are as follows:

$$\nabla\theta_e,\theta_k J(\theta_e,\theta_k) = E_{o_i \sim P_o(o_i|s_i;\theta_e,\theta_k)}$$

$$[R(o_i) \cdot \nabla_{\theta_e,\theta_k} \log P_o(o_i|s_i;\theta_e,\theta_k)]$$

$$\nabla\theta_e,\theta_d J(\theta_e,\theta_d) = E_{\gamma_j^i \sim P_e(\gamma_j^i|h_j^i;\theta_e,\theta_d)}$$

$$[R(\gamma_j^i) \cdot \nabla_{\theta_e,\theta_k} \log P_o(\gamma_j^i|h_j^d;\theta_e,\theta_d)]$$

According to the method for optimizing the training of the text processing model as provided in this embodiment, the parameters are optimized and adjusted through the interactive feedback-bonus mechanism between the keyword indicator and the decoder, thus improving the accuracy and recall rate of the generated keywords.

Figure 4:
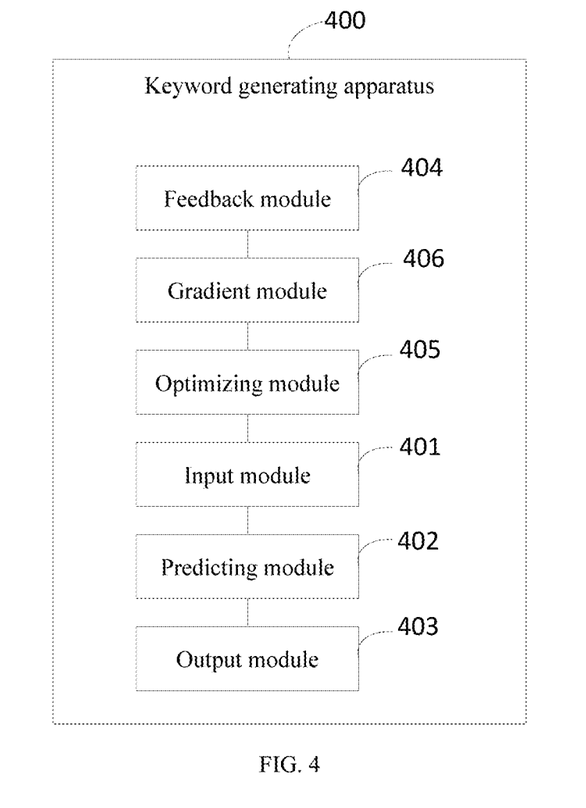
FIG. 4 is a schematic structural diagram of a keyword generating apparatus provided in accordance with an embodiment of this application.

FIG. 4 is a schematic structural diagram of a keyword generating apparatus provided in accordance with an embodiment of this application. As shown in FIG. 4, the keyword generating apparatus 400 includes:

an input module 401, configured to: input a target text into a text processing model, obtain a word sequence corresponding to the target text, and generate a semantic representation sequence corresponding to the word sequence;

a predicting module 402, configured to: make prediction about each semantic representation vector in the semantic representation sequence respectively to obtain a prediction result; and an output module 403, configured to: if the prediction result indicates that a word corresponding to the semantic representation vector is capable of triggering a generation of a keyword, output the keyword based on the semantic representation vector and the prediction result.

Optionally, the input module 401 includes:

a word separating unit, configured to: apply a word separation process to the target text to obtain a word sequence corresponding to the target text;

a determining unit, configured to: determine that the word sequence corresponds to a word vector sequence; and an encoding unit, configured to: encode the word vector sequence using a bi-directional long short-term memory encoder to obtain a corresponding semantic representation sequence.

Optionally, the predicting module 402 includes:

a scanning unit, configured to sequentially scan each semantic representation vector in the semantic representation sequence;

a state unit, configured to determine a state of the keyword indicator at a current moment based on a state of the keyword indicator at a previous moment, an embedded vector of a prediction result of the keyword indicator at the previous moment, and the semantic representation vector; and a predicting unit, configured to determine, based on the state of the keyword indicator at the current moment, a probability of the semantic representation vector triggering a skill phrase; and determine, based on the probability, a prediction result of the keyword indicator, where the prediction result includes that: the semantic representation vector is incapable of triggering generation of a skill phrase, the semantic representation vector is capable of triggering generation of a skill phrase composed of consecutive words, or the semantic representation vector is capable of triggering generation of a skill phrase composed of non-consecutive words.

Optionally, the output module 403 includes:

a hidden state unit, configured to determine an initial hidden state of a decoder based on the semantic representation vector, an embedded vector of a prediction result of the keyword indicator, and a state of the keyword indicator; and a decoding unit, configured to: determine, for each decoding step, a hidden state of each decoding step based on the initial hidden state, and generate the keyword by decoding the hidden state of each decoding step.

Optionally, the hidden state unit includes:

a first hidden state unit, configured to: for a first decoding step, determine a hidden state of the first decoding step based on the initial hidden state, an embedded vector of a prediction result of the keyword indicator, and an embedded vector of default initial character; and a second hidden state unit, configured to: for each decoding step after the first decoding step, determine a hidden state of each decoding step based on a hidden state of a previous decoding step of the decoder, an embedded vector of a prediction result of the keyword indicator, and an embedded vector of a decoding result of the previous decoding step.

Optionally, the decoding unit includes:

a first decoding sub-unit, configured to: determine a correlation of the semantic representation vector to the hidden state of each decoding step, and determine an attention distribution for each decoding step based on the correlation;

a second decoding sub-unit, configured to: determine a semantic vector of the hidden state of each decoding step based on the attention distribution of each decoding step and the semantic representation sequence;

a third decoding sub-unit, configured to: determine an initial word probability for each decoding step based on the hidden state of each decoding step and the semantic vector of the hidden state of each decoding step;

a fourth decoding sub-unit, configured to: determine a word probability for each decoding step based on the initial probability and the attention distribution; and a fifth decoding sub-unit, configured to: determine a decoding result for each decoding step based on the word probability.

Optionally, the keyword generating device 400 further includes:

a feedback module 404, configured to determine a bonus value for the keyword indicator and a bonus value for the decoder based on the prediction result of the keyword indicator and the keyword generated by the decoder, where the bonus value of the keyword indicator is used to indicate an accuracy of the prediction result of the keyword indicator, and the bonus value of the decoder is used to indicate an accuracy of the keyword generated by the decoder; and an optimizing module 405, configured to adjust parameters in the encoder, the keyword indicator and the decoder to maximize an expected value of the bonus value of the keyword indicator and the expected value of the bonus value of the decoder.

Optionally, the bonus value of the keyword indicator and the bonus value of the decoder both include a bonus value corresponding to triggering per keyword and a bonus value corresponding to all keywords.

Optionally, the keyword generating device 400 further includes:

a gradient module 406, configured to: determine an adjustment gradient for the parameters in the encoder, the keyword indicator and the decoder based on the bonus value of the keyword indicator, the bonus value of the decoder, the probability of the prediction result of the keyword indicator and a probability of the decoding result of the decoder.

The keyword generating device provided by the embodiments of this application can perform the technical solution of the keyword generating method in any of the above embodiments following similar implementation principles and producing similar beneficial effects as the keyword generating method. Hence, reference can be made to the implementation principles and beneficial effects of the keyword generating method, which will not be repeated herein.

According to an embodiment of this application, an electronic device, a readable storage medium, and a computer program product are also provided.

Figure 5:
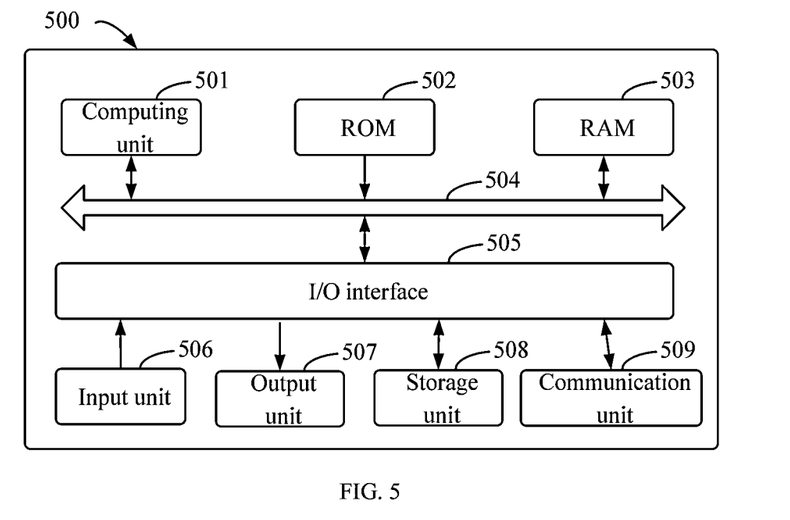
FIG. 5 is a schematic block diagram of an electronic device that can be used for the keyword generating method of an embodiment of this application.

FIG. 5 is a schematic block diagram of an electronic device that can be used for the keyword generating method of an embodiment of this application. The electronic device is intended to represent a digital computer in various forms, such as a laptop computer, a desktop computer, a workstation, a personal digital assistant, a server, a blade server, a mainframe, and/or other appropriate computers. The electronic device may also represent a mobile device in various forms, such as a personal digital processing, a cellular phone, a smart phone, a wearable device, and/or other similar computing devices. The components, their connections and relationships, and their functions as illustrated herein are merely examples, and are not intended to limit the implementation of this disclosure described and/or required herein.

As shown in FIG. 5, the electronic device 500 includes a computing unit 501 that can carry out various appropriate actions and processing based on a computer program stored in a read-only memory (ROM) 502 or a computer program loaded from a storage unit 508 into a random access memory (RAM) 503. In the RAM 503, various programs and data required for the operation of the device 500 can also be stored. The calculating unit 501, the ROM 502, and the RAM 503 are connected to each other via a bus 504. An input/output (I/O) interface 505 is also connected to the bus 504.

Multiple components in the device 500 are connected to the I/O interface 505, including: an input unit 506, such as a keyboard, a mouse, etc.; an output unit 507, such as various types of displays, speakers, etc.; a storage unit 508, such as a magnetic disk, an optical disk, etc.; and a communication unit 509, such as a network adapter, a modem, a wireless communication transceiver, etc. The communication unit 509 allows for the device 500 to exchange information/data with other devices via a computer network, such as the Internet and/or various telecommunication networks.

The computing unit 501 can be various general-purpose and/or special-purpose processing components with processing and computing capabilities. Some examples of computing unit 501 include, but are not limited to, a central processing unit (CPU), a graphics processing unit (GPU), various special purpose artificial intelligence (AI) computing chips, various computing units that run machine learning model algorithms, a digital signal processor (DSP), and any appropriate processor, controller, microcontroller, etc. The calculating unit 501 executes the various methods and processing as described in the foregoing, e.g., the keyword generating method. For example, in some embodiments, the keyword generating method may be implemented as a computer software program which is tangibly contained in a machine-readable medium, such as the storage unit 508. In some embodiments, part or all of the computer program may be loaded and/or installed on the device 500 via the ROM 502 and/or the communication unit 509. When the computer program is loaded into the RAM 503 and executed by the calculating unit 501, one or more steps of the keyword generating method described in the foregoing can be executed. Alternatively, in other embodiments, the computing unit 501 may be configured to execute the keyword generating method in any other suitable manner (e.g., by means of firmware).

Various implementations of the systems and technologies described herein can be implemented in a digital electronic circuit system, an integrated circuit system, a field programmable gate array (FPGA), an application-specific integrated circuit (ASIC), an application-specific standard product (ASSP), a system-on-chip (SOC), a load programmable logic device (CPLD), computer hardware, firmware, software, and/or a combination thereof. These various embodiments may include: implementations in one or more computer programs, which are executable by and/or interpreted on a programmable system including at least one programmable processor, the programmable processor may be application specific or general-purpose and can receive data and instructions from a storage system, at least one input apparatus and/or at least one output apparatus, and can transmit the data and instructions to the storage system, the at least one input apparatus, and the at least one output apparatus.

The program codes used to implement the method of this disclosure can be written in any combination of one or more programming languages. These program codes can be provided to a processor or controller of a general-purpose computer, a special-purpose computer, or other programmable data processing devices, so that when the program codes are executed by the processor or controller, a function/operation specified in the flowcharts and/or block diagrams is implemented. The program code can be executed entirely on a machine, partly on a machine, or as an independent software package that is partly executed on a machine and partly on a remote machine, or entirely on a remote machine or server.

In the context of this disclosure, a machine-readable medium may be a tangible medium, which can contain or store a program for use by, or in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the foregoing. More specific examples of the machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with the user, the systems and technologies described herein can be implemented on a computer that has: a display apparatus (e.g., a cathode ray tube (CRT) or liquid crystal display (LCD) monitor) for displaying information to the user; and a keyboard and a pointing apparatus (e.g., a mouse or a trackball) through which the user can provide input to the computer. Other kinds of devices may also be used to provide interaction with the user. For example, the feedback provided to the user may be any form of sensory feedback (e.g, a visual feedback, an auditory feedback, or a haptic feedback), and may be in any form (including an acoustic input, a voice input, or a haptic input) to receive input from the user.

The systems and technologies described herein can be implemented in a computing system that includes a back-end component (e.g., as a data server), or a middleware components (e.g., an application server), or a front-end component (e.g., a user computer with a graphical user interface or web browser through which the user can interact with the implementation of the systems and technologies described herein), or any combination of such back-end component, middleware component or front-end component. Various components of the system may be interconnected by digital data communication in any form or via medium (e.g., a communication network). Examples of a communication network include: a local area network (LAN), a wide area network (WAN) and the Internet.

The computer system may include a client and a server. The client and server are typically remote from each other and interact via a communication network. The client-server relationship is created by computer programs running on respective computers having a client-server relationship with each other. The server can be a cloud server, also known as a cloud computing server or a cloud host. It is a mainframe product in the cloud computing service system to solve shortcomings in the traditional physical mainframe and VPS service (Virtual Private Server) associated with difficulties in administrations and low business scalability. The server can also be a server of a distributed system, or a server combined with a blockchain.

It should be understood that the various forms of processes shown above can be reordered, and steps may be add or removed. For example, various steps described in this application can be executed in parallel, in sequence, or in alternative orders. As long as the desired results of the technical solutions disclosed in this application can be achieved, no limitation is imposed herein.

The foregoing specific implementations do not constitute any limitation on the protection scope of this application. It should be understood by those skilled in the art that various modifications, combinations, sub-combinations and substitutions may be made as needed by design requirements and other factors. Any and all modification, equivalent substitution, improvement or the like within the spirit and concept of this application shall fall within the protection scope of this application.

What is claimed is:

1. A keyword generating method, comprising:
   inputting a target text into a text processing model, obtaining a word sequence corresponding to the target text, and generating a semantic representation sequence corresponding to the word sequence;
   making a prediction about each semantic representation vector in the semantic representation sequence respectively to obtain a prediction result; and
   if the prediction result indicates that a word corresponding to the semantic representation vector is capable of triggering a generation of a keyword, outputting the keyword based on the semantic representation vector and the prediction result; and
   wherein the making a prediction about each semantic representation vector in the semantic representation sequence respectively to obtain a prediction result comprises:
   sequentially scanning, by a keyword indicator in the text processing model, each semantic representation vector in the semantic representation sequence;
   determining a state of the keyword indicator at a current moment based on a state of the keyword indicator at a previous moment, an embedded vector of a prediction result of the keyword indicator at the previous moment, and the semantic representation vector; and determining, based on the state of the keyword indicator at the current moment, a probability of the semantic representation vector triggering a skill phrase; and determining, based on the probability, a prediction result of the keyword indicator, wherein the prediction result comprises: the semantic representation vector is incapable of triggering generation of a skill phrase, the semantic representation vector is capable of triggering generation of a skill phrase composed of consecutive words, or the semantic representation vector is capable of triggering generation of a skill phrase composed of non-consecutive words; and wherein the outputting the keyword based on the semantic representation vector and the prediction result comprises:

determining, by a decoder, an initial hidden state of the decoder based on the semantic representation vector, an embedded vector of a prediction result of the keyword indicator, and a state of the keyword indicator; and determining, for each decoding step, a hidden state of each decoding step based on the initial hidden state, and generating the keyword by decoding the hidden state of each decoding step.

2. The method according to claim 1, wherein the obtaining a word sequence corresponding to the target text, and generating a semantic representation sequence corresponding to the word sequence comprises:

applying a word separation process to the target text to obtain a word sequence corresponding to the target text;

determining a word vector sequence corresponding to the word sequence; and encoding the word vector sequence using a bi-directional long short-term memory encoder to obtain a corresponding semantic representation sequence.

3. The method according to claim 1, wherein the determining, for each decoding step, a hidden state of each decoding step based on the initial hidden state comprises:

for a first decoding step, determining a hidden state of the first decoding step based on the initial hidden state, an embedded vector of a prediction result of the keyword indicator, and an embedded vector of default initial character; and for each decoding step after the first decoding step, determining a hidden state of each decoding step based on a hidden state of a previous decoding step of the decoder, an embedded vector of a prediction result of the keyword indicator, and an embedded vector of a decoding result of the previous decoding step.

4. The method according to claim 1, wherein the generating the keyword by decoding the hidden state of each decoding step comprises:

determining a correlation of the semantic representation vector to the hidden state of each decoding step, and determining an attention distribution for each decoding step based on the correlation;

determining a semantic vector of the hidden state of each decoding step based on the attention distribution of each decoding step and the semantic representation sequence;

determining an initial word probability for each decoding step based on the hidden state of each decoding step and the semantic vector of the hidden state of each decoding step;

determining a word probability for each decoding step based on the initial word probability and the attention distribution; and determining a decoding result for each decoding step based on the word probability.

5. The method according to claim 1, further comprising:

determining a bonus value for the keyword indicator and a bonus value for the decoder based on the prediction result of the keyword indicator and the keyword generated by the decoder, wherein the bonus value of the keyword indicator is used to indicate an accuracy of the prediction result of the keyword indicator, and the bonus value of the decoder is used to indicate an accuracy of the keyword generated by the decoder; and adjusting parameters in the encoder, the keyword indicator and the decoder to maximize an expected value of the bonus value of the keyword indicator and the expected value of the bonus value of the decoder.

6. The method according to claim 5, wherein the bonus value of the keyword indicator and the bonus value of the decoder both comprise a bonus value corresponding to triggering per keyword and a bonus value corresponding to all keywords.

7. The method according to claim 5, further comprising:

determining an adjustment gradient for the parameters in the encoder, the keyword indicator and the decoder based on the bonus value of the keyword indicator, the bonus value of the decoder, the probability of the prediction result of the keyword indicator and a probability of the decoding result of the decoder.

8. A non-transitory computer readable storage medium, storing thereon computer instructions that are used to cause a computer to execute the method according to claim 1.

9. An electronic device, comprising:

at least one processor; and a memory in communication with the at least one processor, wherein:

the memory stores thereon instructions executable by the at least one processor, and the instructions are executed by the at least one processor to enable the at least one processor to:

input a target text into a text processing model, obtain a word sequence corresponding to the target text, and generate a semantic representation sequence corresponding to the word sequence;

make a prediction about each semantic representation vector in the semantic representation sequence respectively to obtain a prediction result; and if the prediction result indicates that a word corresponding to the semantic representation vector is capable of triggering a generation of a keyword, output the keyword based on the semantic representation vector and the prediction result; and wherein the at least one processor is further enabled to:

sequentially scan each semantic representation vector in the semantic representation sequence;

determine a state of the keyword indicator at a current moment based on a state of the keyword indicator at a previous moment, an embedded vector of a prediction result of the keyword indicator at the previous moment, and the semantic representation vector; and determine, based on the state of the keyword indicator at the current moment, a probability of the semantic representation vector triggering a skill phrase; and determine, based on the probability, a prediction result of the keyword indicator, wherein the prediction result comprises: the semantic representation vector is incapable of triggering generation of a skill phrase, the semantic representation vector is capable of triggering generation of a skill phrase composed of consecutive words, or the semantic representation vector is capable of triggering generation of a skill phrase composed of non-consecutive words; and wherein the at least one processor is further enabled to:

determine an initial hidden state of a decoder based on the semantic representation vector, an embedded vector of a prediction result of the keyword indicator, and a state of the keyword indicator; and determine, for each decoding step, a hidden state of each decoding step based on the initial hidden state, and generate the keyword by decoding the hidden state of each decoding step.

10. The electronic device according to claim 9, wherein the at least one processor is further enabled to:

apply a word separation process to the target text to obtain a word sequence corresponding to the target text;

determine a word vector sequence corresponding to the word sequence; and encode the word vector sequence using a bi-directional long short-term memory encoder to obtain a corresponding semantic representation sequence.

11. The electronic device according to claim 9, wherein the at least one processor is further enabled to:

for a first decoding step, determine a hidden state of the first decoding step based on the initial hidden state, an embedded vector of a prediction result of the keyword indicator, and an embedded vector of default initial character; and for each decoding step after the first decoding step, determine a hidden state of each decoding step based on a hidden state of a previous decoding step of the decoder, an embedded vector of a prediction result of the keyword indicator, and an embedded vector of a decoding result of the previous decoding step.

12. The electronic device according to claim 9, wherein the at least one processor is further enabled to:

determine a correlation of the semantic representation vector to the hidden state of each decoding step, and determine an attention distribution for each decoding step based on the correlation;

determine a semantic vector of the hidden state of each decoding step based on the attention distribution of each decoding step and the semantic representation sequence;

determine an initial word probability for each decoding step based on the hidden state of each decoding step and the semantic vector of the hidden state of each decoding step;

determine a word probability for each decoding step based on the initial word probability and the attention distribution; and determine a decoding result for each decoding step based on the word probability.

13. The electronic device according to claim 9, wherein the at least one processor is further enabled to:

determine a bonus value for the keyword indicator and a bonus value for the decoder based on the prediction result of the keyword indicator and the keyword generated by the decoder, wherein the bonus value of the keyword indicator is used to indicate an accuracy of the prediction result of the keyword indicator, and the bonus value of the decoder is used to indicate an accuracy of the keyword generated by the decoder; and adjust parameters in the encoder, the keyword indicator and the decoder to maximize an expected value of the bonus value of the keyword indicator and the expected value of the bonus value of the decoder.

14. The electronic device according to claim 13, wherein the bonus value of the keyword indicator and the bonus value of the decoder both comprise a bonus value corresponding to triggering per keyword and a bonus value corresponding to all keywords.

15. The electronic device according to claim 13, wherein the at least one processor is further enabled to:

determine an adjustment gradient for the parameters in the encoder, the keyword indicator and the decoder based on the bonus value of the keyword indicator, the bonus value of the decoder, the probability of the prediction result of the keyword indicator and a probability of the decoding result of the decoder.

* * * * *